United States Patent [19]
Daily et al.

[11] Patent Number: 6,076,324
[45] Date of Patent: Jun. 20, 2000

[54] TRUSS STRUCTURE DESIGN

[75] Inventors: Carl S. Daily, Derry; Daniel A. Lees, Weare; Dennis Donald McKitterick, Londonderry, all of N.H.

[73] Assignee: Nu-Cast Inc., Londonderry, N.H.

[21] Appl. No.: 08/966,053

[22] Filed: Nov. 7, 1997

Related U.S. Application Data

[60] Provisional application No. 60/030,709, Nov. 8, 1996.

[51] Int. Cl.$^7$ ..................................................... E04C 3/02
[52] U.S. Cl. ...................... 52/648.1; 52/653.1; 52/652.1; 52/650.3; 52/637; 52/646
[58] Field of Search ................................ 52/653.1, 648.1, 52/652.1, 650.3, 637, 646, 655.1, 654.1

[56] References Cited

U.S. PATENT DOCUMENTS

| | | | |
|---|---|---|---|
| 3,421,280 | 1/1969 | Attwood et al. | 52/648.1 |
| 3,705,473 | 12/1972 | Yeffal-Rueda | 52/650 |
| 4,711,057 | 12/1987 | Lew et al. | 52/81.2 |
| 4,745,725 | 5/1988 | Onoda | 52/646 |
| 4,996,010 | 2/1991 | Modrek | 264/22 |
| 5,059,021 | 10/1991 | Spence et al. | 356/121 |
| 5,070,673 | 12/1991 | Weisse | 52/808 |
| 5,130,064 | 7/1992 | Smalley et al. | 264/22 |
| 5,133,987 | 7/1992 | Spence et al. | 427/53 |
| 5,155,321 | 10/1992 | Grube et al. | 219/121 |
| 5,174,943 | 12/1992 | Hull | 264/308 |
| 5,182,056 | 1/1993 | Spence et al. | 264/22 |
| 5,184,307 | 2/1993 | Hull et al. | 364/474 |
| 5,192,559 | 3/1993 | Hull et al. | 425/89 |
| 5,265,395 | 11/1993 | Lalvani | 52/648.1 |
| 5,279,590 | 1/1994 | Sinko et al. | 604/263 |
| 5,342,919 | 8/1994 | Dickens, Jr. et al. | 528/323 |
| 5,345,391 | 9/1994 | Hull et al. | 264/474 |
| 5,352,405 | 10/1994 | Beaman et al. | 419/45 |
| 5,501,824 | 3/1996 | Almquist et al. | 264/401 |
| 5,505,035 | 4/1996 | Lalvani | 52/648.1 |
| 5,554,336 | 9/1996 | Hull | 264/401 |
| 5,556,590 | 9/1996 | Hull | 264/401 |

*Primary Examiner*—Christopher T. Kent
*Assistant Examiner*—Jennifer I. Thissell
*Attorney, Agent, or Firm*—Hayes, Soloway, Hennessey, Grossman & Hage, P.C.

[57] ABSTRACT

An integrally formed three-dimensional truss structure, including molds and methods for production of same, containing outer top and bottom plane surfaces thereof comprising interconnected rod segments integrally formed at their points of intersection on the outer top and bottom surfaces, the top and bottom surfaces also integrally joined together through additional interconnected rod segments passing through an integrally formed intersection, wherein the additional interconnected rod segments passing through the integrally formed intersection form a three-dimensional continuous array of triangles.

4 Claims, 6 Drawing Sheets

TRUSS STRUCTURE DESIGN

CROSS-REFERENCE TO RELATED APPLICATIONS

This application is based upon provisional U.S. patent application Ser. No. 60/030,709, filed Nov. 8, 1996.

U.S. Government has a paid-up license in this invention and the right in limited circumstances to require the patent owner to license others on reasonable terms as provided for the terms of contract number NA55-00007 awarded by NASA.

BACKGROUND OF THE INVENTION

1. Field of the Invention

The present invention relates to improved structural designs and methods for their manufacture. More particularly, the invention is directed at the use of stereo lithography or other rapid prototyping techniques for the preparation of integrally formed three-dimensional truss configurations, in addition to the use of such truss configurations as disposable patterns for the production of casting molds.

2. Background of the Invention

The search for lighter and stronger load bearing designs along with improvements in stiffness and strength-to-weight ratios has been a major focus in the field of material science for many years. To date, research in this area has primarily focused on exotic metals and alloys such as beryllium and titanium alloys, and composite materials. Typical composite materials may consist of fibers (or whiskers) made of glass, carbon, polymer or metal (boron, silicon carbide or aluminum oxide). Fiber-reinforced composites were developed in response primarily to the aerospace industry's need for advanced materials with a high strength and/or stiffness-to-weight ratio.

Various honeycomb structural materials have been proposed for providing high strength-to-weight characteristics. However, such honeycomb materials typically depend on their skin for strength. Such structures also are poor in response to shear stress, and reveal poor redistribution of loads.

Recently issued U.S. Pat. No. 5,527,590 (the '590 patent) describes a lattice block material formed from a lattice of fine metallic fibers which are welded together to form a three-dimensional, continuous array of triagonal structures in the form of a series of equilateral triangles. While the three-dimensional welded wire lattice block material described in the '590 patent is believed to offer advantages over prior art structures such as honeycomb systems which rely on a stress skin, the three-dimensional welded wire lattice block material of the '590 patent has certain disadvantages. For one, the materials are cumbersome to manufacture, requiring both intricate and exacting weaving and alignment steps, and multiple welding steps. Welding also has a disadvantage in that a welding operation may change the crystalline structure of the metal wire, and thus may adversely affect metallurgical properties. Also, each weld point represents a potential defect site for crack propagation, corrosion and/or material failure.

Recent advances in stereo lithography permit the production of models of complex shape formed of wax or low melting polymers or other heat-disposable materials. These disposable materials may be formed into full size models having the exact geometry of the required finished product. The models may then be used to produce ceramic shell molds, which in turn may be used to produce unitary cast products of complex shape.

For example, in U.S. Pat. No. 5,556,590, there is disclosed an apparatus for producing a three-dimensional object from a medium capable of solidification when subjected to synergistic stimulation. The apparatus is said to comprise a container for holding said medium, a means for viewing said object during formation and for shielding the viewer from excess synergistic stimulation, and means for forming successive cross-sectional layers of structure of said object at a surface of said medium, said forming means including means for adhering each successive cross-sectional layer of structure to a preceding cross-sectional layer of structure to produce said object.

Attention is also directed to U.S. Pat. No. 5,554,336 which similarly discloses a system for generating three-dimensional objects by creating a cross-sectional pattern of the object to be formed at a selected surface of a fluid medium capable of altering its physical state in response to appropriate synergistic stimulation by impinging radiation, particle bombardment or chemical reaction.

Other related U.S. Patents of interest include U.S. Pat. No. 5,182,056, entitled "Stereolithography Method and Apparatus Employing Various Penetration Depths"; U.S. Pat. No. 5,501,284, entitled "Thermal Stereolithography"; U.S. Pat. No. 5,184,307 entitled "Method and Apparatus for Production of High Resolution Three-Dimensional Objects by Stereolithography"; U.S. Pat. No. 5,174,943 entitled "Method for Production of Three-Dimensional Objects by Stereolithography"; U.S. Pat. No. 5,133,987 entitled "Stereolithographic Apparatus and Method"; U.S. Pat. No. 5,130,064 entitled "Method of Making a Three Dimensional Object by Stereolithography"; U.S. Pat. No. 5,059,021 entitled "Apparatus and Method for Correcting for Drift in Production of Objects by Stereolithography"; U.S. Pat. No. 4,996,010 entitled "Methods and Apparatus for Production of Three-Dimensional Objects by Stereolithography"; U.S. Pat. No. 5,192,559 entitled "Apparatus for Building Three-Dimensional Objects with Sheets"; and U.S. Pat. No. 5,345,391 entitled "Method and Apparatus for Production of High Resolution Three-Dimensional Objects by Stereolithography".

Accordingly, it is an object of the present invention to make use of the recent advances in stereolithography, as applied to the preparation of an integrally formed high-strength light-weight three-dimensional truss structures, and to employ such integrally formed three-dimensional truss structures for the production of casting molds, so that said three-dimensional truss structures can be readily manufactured by investment casting procedures.

SUMMARY OF THE INVENTION

In a first exemplary embodiment, the present invention comprises an integrally formed three-dimensional truss structure containing outer top and bottom plane surfaces thereof comprising interconnected rod segments, said rod segments integrally formed at their points of intersection on said outer top and bottom surfaces, said top and bottom surfaces integrally joined together through additional interconnected rod segments passing through an integrally formed intersection, wherein said additional interconnected rod segments passing through said integrally formed intersection form a three-dimensional continuous array of triangles.

In addition, the present invention includes a method of producing a casting or shell mold for preparation of said three-dimensional truss structure. The method comprises the basic steps of first providing an apparatus for producing said integrally formed three-dimensional truss structure from a disposable pattern material, followed by the steps of coating said disposable pattern material with a solid coating, and removing said pattern material to provide said casting or shell mold. The casting or shell mold therefore provides a route for casting a three-dimensional truss structure substantially identical to that of the original three-dimensional truss structure made of said disposable pattern material.

BRIEF DESCRIPTION OF THE DRAWINGS

For a better understanding of the nature of the present invention, reference should be made to the following detailed description and the accompanying drawings, in which.

DESCRIPTION OF THE PREFERRED EMBODIMENTS

Figure 1:
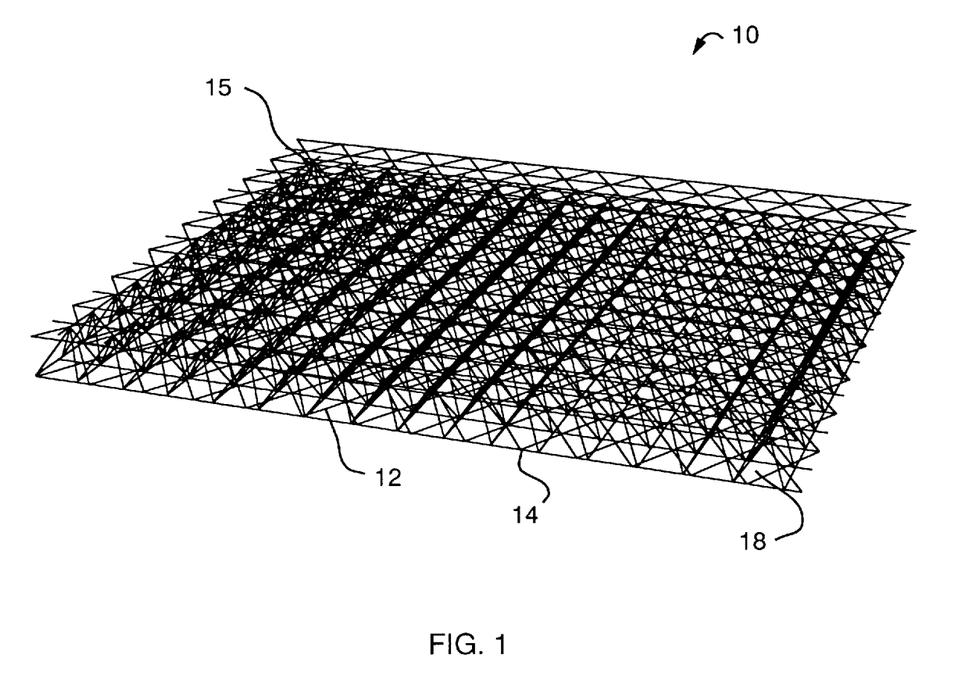
FIG. 1 is a perspective view of one truss structure of the present invention.

Referring to FIG. 1, the present invention preferably employs stereo lithography methods to produce patterns, which in turn are used to produce ceramic shell molds for use in producing unitary or integrally formed cast products 10 comprising a multi-layer configuration preferably consisting of uniformly stacked pyramids 18 in a three-dimensional array, i.e. mimicking geometrically the welded wire lattice block material of the '590 patent. However, in the broad context of the present invention, other techniques are contemplated for the preparation of the integrally formed truss structures herein, such as wax or plastic injection molding.

The truss structure 10 is shown to comprise integral segments 12 joined at their vertices 14 on the bottom plane surface thereof, as well as being joined at the top plane surface at 15. The preferred overall process for preparation of the truss structures disclosed herein is as follows: The stereo lithography process begins with a three-dimensional mathematical model stored in the stereo lithography apparatus slice processor. The role of the slice processor is to transform complex, three-dimensional designs into a series of two-dimensional layers that represent the desired physical object. The stereo lithography apparatus then literally draws each layer on the surface of a photopolymer bath, using a computer controlled optical scanning system. Wherever the laser light scans the liquid surface, the resin hardens, and an accurate reproduction of the layer is produced.

The newly formed layer is then mechanically lowered into the resin bath, and liquid resin flowed over the partially completed object. The next layer is drawn; it adheres to the previous one and the process repeated until the entire part has been built, layer-by-layer, from the bottom up.

Figure 2:
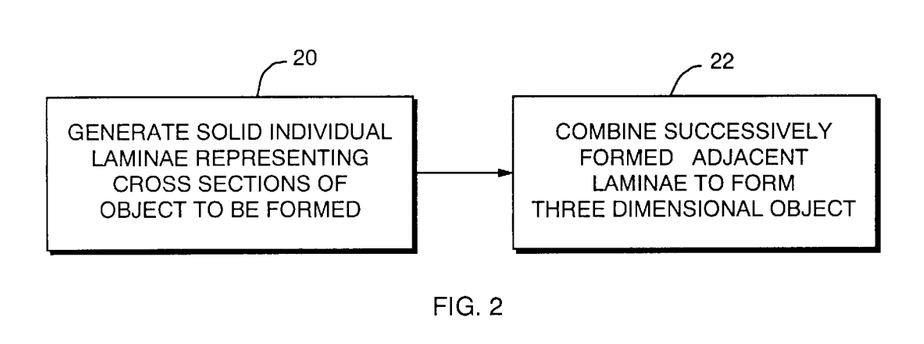
FIGS. 2 and 3 are flow charts illustrating the basic concepts of stereolithography as a preferred practice in the method of the present invention.
Figure 3:
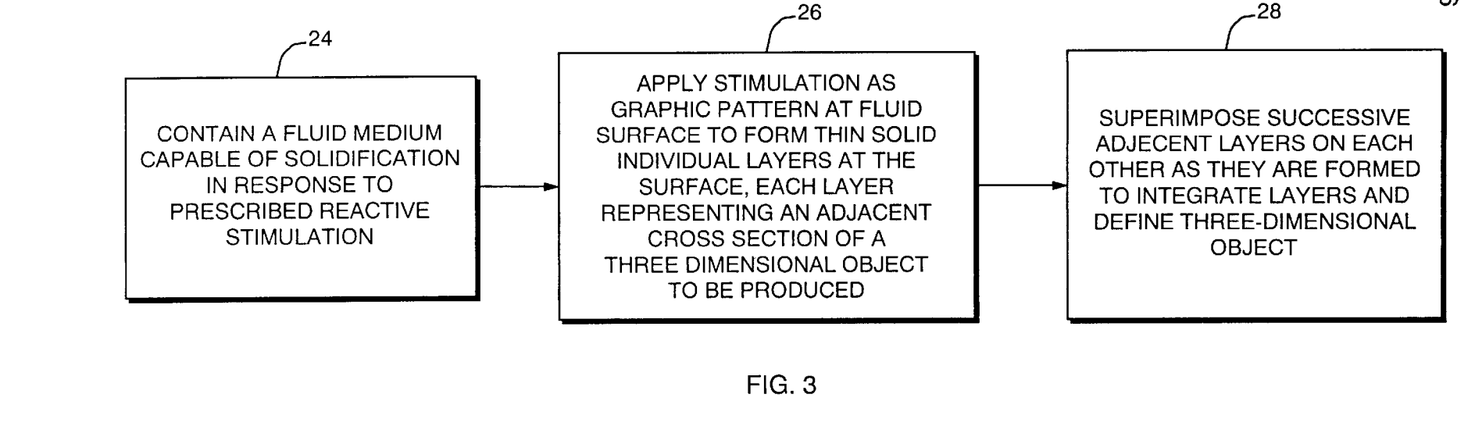

More particularly, as seen in FIGS. 2–3, the stereo lithography process begins with step 20 which calls for the generation of individual solid laminae representing cross-sections of a three-dimensional object which has been programmed into the system for selective curing. Hence, the stereo lithographic system generates three-dimensional objects by creating a layered pattern of the object to be formed at a selected surface of a fluid medium, e.g. a UV curable liquid or the like, capable of altering its physical state in response to appropriate synergistic stimulation such as impinging radiation, electron beam or other particle bombardment, or applied chemicals as by ink jet or spraying over a mask adjacent the fluid surface. Successive adjacent laminae, representing corresponding successive adjacent layers of the object are formed and integrated together to provide a step-wise laminar or thin layer buildup of the object, whereby a three-dimensional object is formed and drawn from a substantially planar or sheet-like surface of the fluid medium during the forming process.

The aforedescribed technique is more specifically outlined in the flowchart of FIG. 3, wherein step 24 calls for containing a fluid medium capable of solidification in response to prescribed reactive stimulation. Step 26 calls for application of that stimulation as a graphic pattern at a designated fluid surface to form thin, solid, individual layers at that surface, each layer representing adjacent layers of a three-dimensional object to be produced. It is desirable to make each such layer as thin as possible in order to maximize resolution and the accurate reproduction of the three-dimensional object being formed. Hence, the ideal theoretical state would be an object produced only at the designated working surface of the fluid medium to provide an infinite number of laminae, each lamina having a cured depth of approximately only slightly more than zero thickness. Of course, in the practical application of the invention, each lamina will be a thin lamina, but thick enough to be adequately cohesive in forming the cross-section and adhering to the adjacent laminae defining other layers of the object being formed.

Step 28 in FIG. 2 calls for superimposing successive adjacent layers or laminae on each other as they are formed, to integrate the various layers and define the desired three-dimensional object. In the normal practice as the fluid medium cures and solid material forms to define one lamina, that lamina is moved away from the working surface of the fluid medium and the next lamina is formed in the new liquid which replaces the previously formed lamina, so that each successive lamina is superimposed and integral with (by virtue of the natural adhesive properties of the cured fluid medium) all of the other cross-sectional laminae. Hence, the process of producing such layered laminae is repeated over and over again until the entire three dimensional object has been formed. The object is then removed and the system is ready to produce another model.

Further details of the aforesaid stereo lithography process is set forth in U.S. Pat. No. 5,554,336.

The model part also may be formed by other processes. For example, the model may be formed by selectively exposing to synergistic stimulation a thin sheet of material using a similar process to the three-dimensional slice process technique above-described. Unexposed areas are removed, whereby successive sheets corresponding to successive cross-sectional layers are laid up and selectively exposed in turn to synergistic stimulation and integrated together with preceding layers to provide a layer-by-layer buildup of the desired three-dimensional model. See, for example, U.S. Pat. No. 5,192,559.

The model also may be produced by selective laser sintering. In selective layer sintering, the power of a laser beam is modulated so as to selectively sinter particles. In the overall process a layer is first deposited on a work table and selectively sintered. A second layer is laid on the first and selectively sintered to the first, and so on. This cycle is repeated until the part, consisting of particles of powder that are sintered together, is complete. The unsintered powder is then removed to reveal the finished part.

The model also may be formed by fused deposition molding, for example, employing thermal plotters to print a bead of wax or wax/polymer mixture in two axes while an elevator controls the direction. See, INCAST, March 1991, Volume IV, No. 3. Finally, the model herein can also be manufactured from cornstarch as made available by the Z-Corporation, Cambridge, Mass.

The resulting models are then preferably used to produce ceramic shell molds which in turn may be used to produce unitary cast products of desired shape. However, in the broad context of the present invention, any casting technique known in the art is contemplated.

Figure 4:
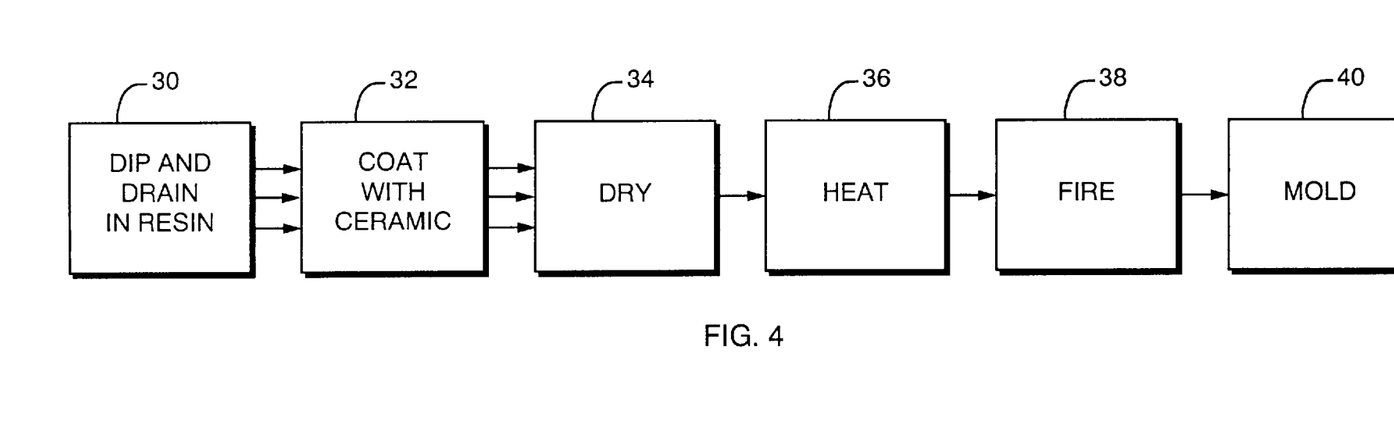
FIG. 4 is a flow chart illustrating the preferred method for producing a casting mold of the three-dimensional truss structure in accordance with the present invention.

Referring next to FIG. 4, the models are dipped and drained in a ceramic slurry at step 30, and then passed to a coating step 32, while still wet, where they are coated with fine ceramic sand. After drying at step 34, the dripping, draining, coating and drying processes are preferably repeated, again and again, using progressively coarser grades of ceramic material, until a self-supporting shell is formed.

The shell is then placed in a high temperature furnace or steam autoclave at step 36 where the pattern melts and is permitted to run out through gates on runners formed in the shell. This leaves a ceramic shell containing a cavity in the shape of the desired product. The ceramic shell is then fired at step 38 to burn out the last traces of pattern material, and the mold optionally can be preheated in preparation for casting. Molten alloy is then poured into the mold at step 40 in known manner, e.g. using gravity, vacuum, pressure and/or centrifugal force to introduce such molten alloy.

Figure 5:
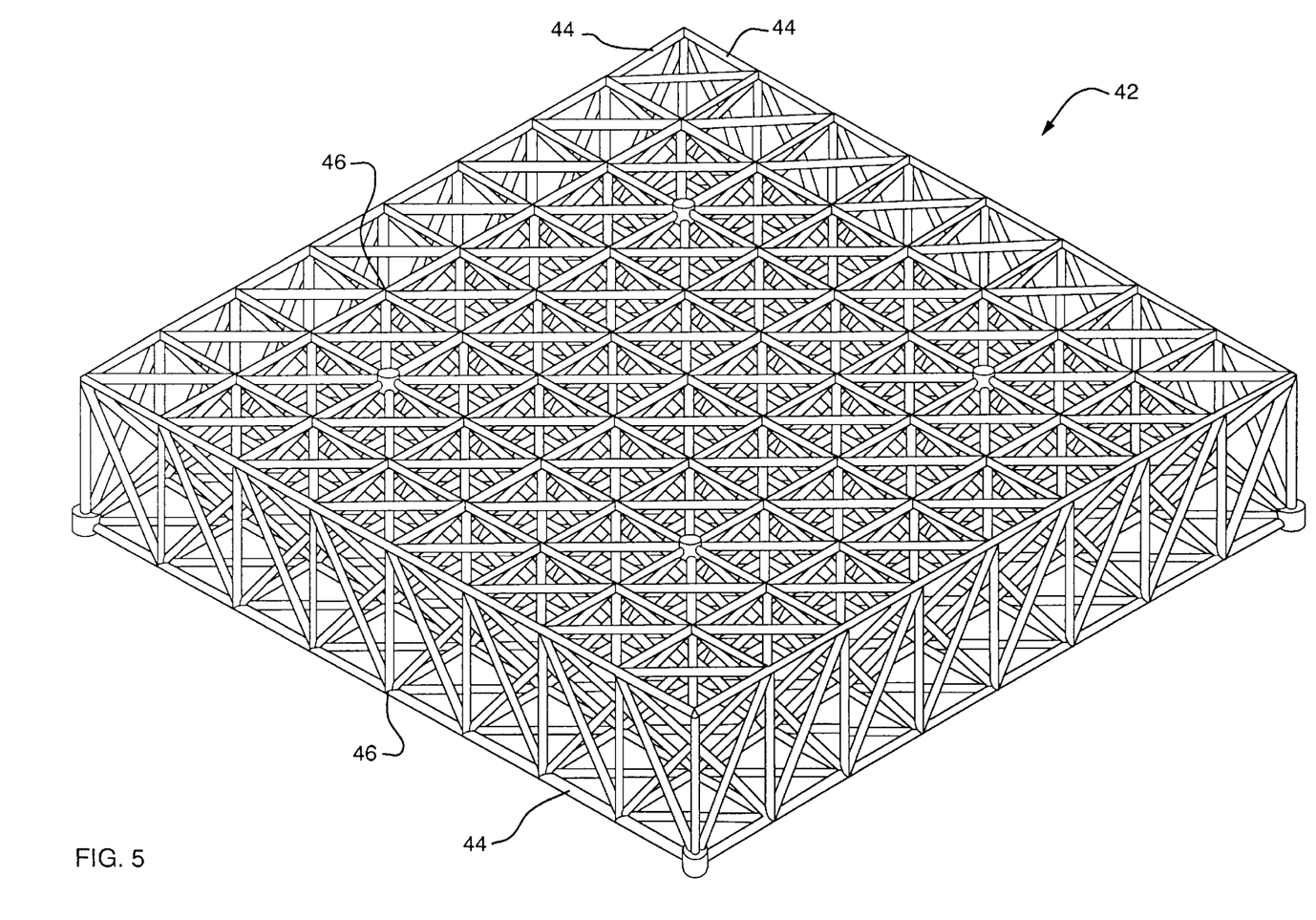
FIG. 5 is another perspective view of another typical truss structural configuration produced in accordance with the present invention.

After the poured molds have cooled, the mold is removed leaving a casting of desired geometric shape (see, e.g., FIG. 1). However, as illustrated more specifically in FIG. 5, other geometries are possible for the integrally formed three-dimensional truss structures of the present invention. That is, as shown in FIG. 5, the three-dimensional structure therein 42 contains integrally formed interconnected rod segments 44 joined at their vertices 46, wherein 46 lies on the top plane surface thereof. In addition, as also illustrated in FIG. 5, rod segments 44 when of equal length, provide a substantially square configuration. In addition, it is worth noting that FIG. 5 is similar to FIG. 1, but with no mid-plane connections.

Figure 6:
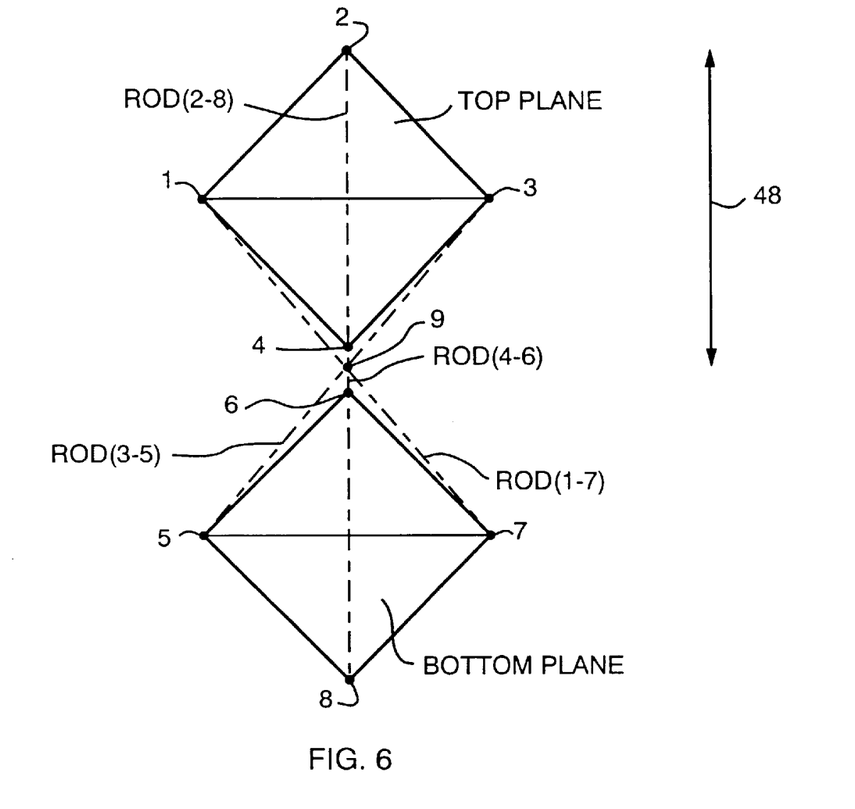
FIG. 6 is a more detailed view of the truss structure of FIG. 5, illustrating the integrally formed intersection of the interconnected segments therein.

A more detailed view of the truss structure of FIG. 5, illustrating the integrally formed intersection of the herein described additional interconnected rod segments, is shown in FIG. 6. More specifically, FIG. 6 identifies top plane and bottom plane surfaces therein, and four additional interconnecting rods connecting said planes at what can be termed a four-rod intersection point 9. That is, a rod runs from 1 on the top plane through intersection point 9 and connects to point 7 on said bottom plane. Similarly, a rod connects point 2 on the top plane through intersection point 9 connecting to point 8 on said bottom plane. Rods also connect points 3 and 5 and points 4 and 6, again through intersection point 9.

In preferred embodiment, at least two of any of said additional interconnected rod segments are disposed at an angle relative to one another of about 60 degrees, and form a three-dimensional continuous array of equilateral triangles. With reference to FIG. 6, an exemplary triangle can be seen as one follows the connection of points 7, 8, and 9. However, with regards to the three-dimensional truss structures herein, it can be appreciated that depending upon the height 48 of the truss structure, different angles will be employed. In addition, it should be noted that in the broad context of the present invention, the rod segments herein are preferably round to maximize load bearing ability, although other geometries are possible. In addition, rod diameter can vary depending upon load bearing requirements.

Figure 7:
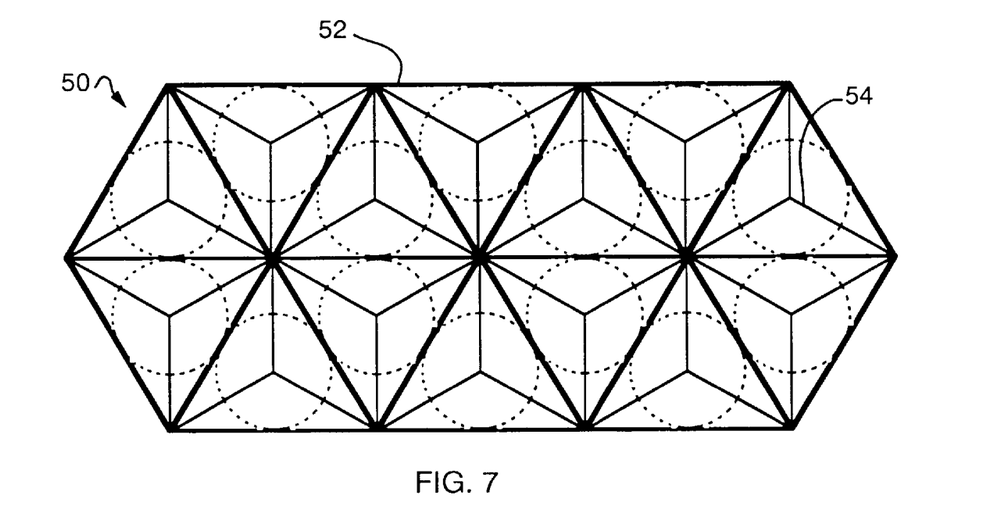
FIG. 7 is yet another perspective view of another exemplary structural material produced in accordance with the present invention, detailing an optional all-equilateral triangle three-dimensional truss structure.
Figure 8:
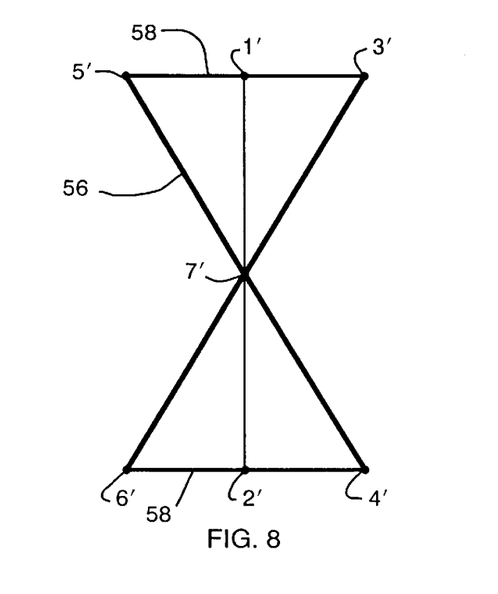
FIG. 8 illustrates in further schematic view the internal equilateral triangle configuration of FIG. 7.
Figure 9:
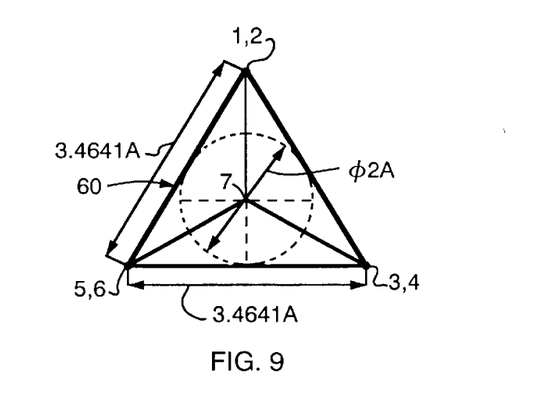
FIG. 9 illustrates in further detail the in-plane equilateral triangles truss structure with a circle of diameter 2A.
Figure 10:
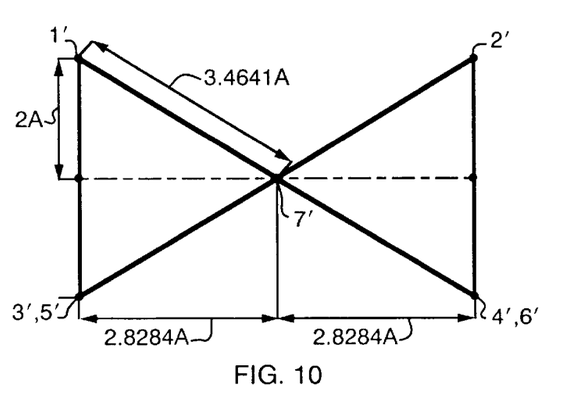
FIG. 10 illustrates a side view of FIG. 8 wherein the various dimensions of the segments therein are reported with respect to the value of A in FIG. 9.

Alternatively, as shown in FIG. 7 one can preferably employ an all-equilateral triangle three-dimensional truss structure 50. The bold lines at 52 depict in-plane structure (rods) present at top and bottom planes thereof. At 54 are shown the intersecting rods, out-of-plane. FIG. 8 illustrates in further schematic view the internal equilateral triangle configuration. More specifically, in FIG. 8, the connecting rods are seen to pass through a six-rod intersection point 7' that is out-of-plane. The outer planes are shown at 58. Rods and their associated connection pathways are shown at 1'-7'-2', 3'-7'-6' and 4'-7'-5'. FIG. 9 illustrates in further detail the in-plane equilateral triangles 60 of truss structure 50, wherein it is shown that a circle of diameter 2A fits within said structure. Accordingly, the dimensions of the equilateral triangle are shown to be 3.4641A. Finally, FIG. 10 illustrates a side view of FIG. 8, wherein the various dimensions of the segments therein are reported with respect to the value of A in FIG. 9.

The invention is susceptible to modification. For example, it also is possible to form the ceramic mold directly. In such process, the shell is made in thin layers using, for example, ink jet technology to spray a binder on ceramic powder particles. The powder is added in thin layers and the process repeated for each layer. When the part is completed, the shell is removed from the tank of powder, excess powder is poured out, and the shell is fired to bind the ceramic powder. The shell is then ready for pouring.

Forming three-dimensional materials by investment casting permits a superior product metallurgically to be made in a reproducible manner that has advantages over the weave and weld manufacturing process described in the '590 patent.

It will thus be seen that the invention efficiently attains the objects set forth above, among those made apparent from the preceding description. In particular, the invention provides a high strength light-weight integrally formed three-dimensional truss type structural material, and an efficient method for its production. It will therefore be understood that changes may be made in the above procedures, without departing from the scope of the invention, as recited in the following claims.

I claim:

1. An integrally formed dimensionally stable three-dimensional unitary truss structure containing outer top and bottom plane surfaces thereof comprising interconnected dimensionally stable in-plane rod segments, said in-plane rod segments integrally formed at their points of intersection on said outer top and bottom surfaces and extending parallel to said top and bottom surfaces, said top and bottom surfaces integrally joined together through additional interconnected dimensionally stable rod segments passing through an integrally formed dimensionally stable intersection, wherein said additional interconnected rod segments passing through said integrally formed intersection form an unitary dimensionally stable three-dimensional continuous array of triangles.

2. The integrally formed dimensionally stable three-dimensional truss structure of claim 1, wherein said continuous array of triangles comprises equilateral triangles.

3. An integrally formed dimensionally stable three-dimensional unitary truss structure, formed by the process of casting a liquid medium into a shell mold, and solidifying said liquid into a three-dimensional truss structure, said truss structure containing outer top and bottom plane surfaces thereof comprising interconnected dimensionally stable in-plane rod segments, said in-plane rod segments integrally formed at their points of intersection on said outer top and bottom surfaces and extending parallel to said top and bottom surfaces, said top and bottom surfaces integrally joined together through additional interconnected dimensionally stable rod segments passing through an integrally formed dimensionally stable intersection, wherein said additional interconnected rod segments passing through said integrally formed intersection form an unitary dimensionally stable three-dimensional continuous array of triangles.

4. The integrally formed dimensionally stable three-dimensional truss structure of claim 3, wherein said continuous array of triangles comprises equilateral triangles.

* * * * *